Oct. 1, 1940.  J. LEDWINKA  2,216,715
FLEXIBLE SUPPORT
Filed April 9, 1937  3 Sheets-Sheet 1

INVENTOR.
Joseph Ledwinka
BY
ATTORNEY.

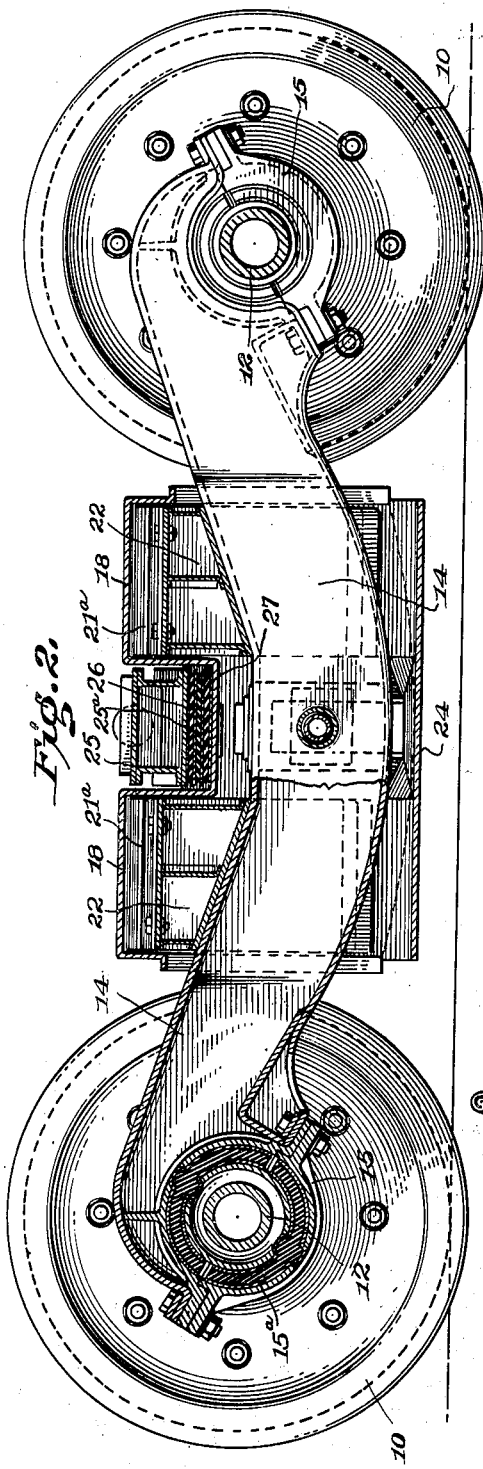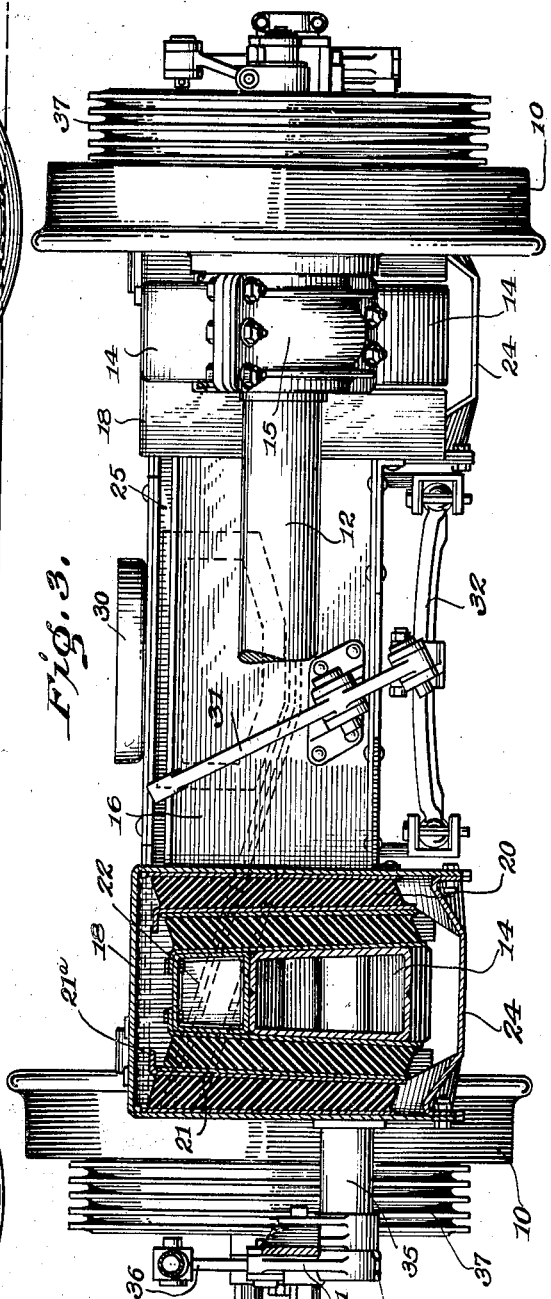

Oct. 1, 1940.  J. LEDWINKA  2,216,715
FLEXIBLE SUPPORT
Filed April 9, 1937  3 Sheets-Sheet 3
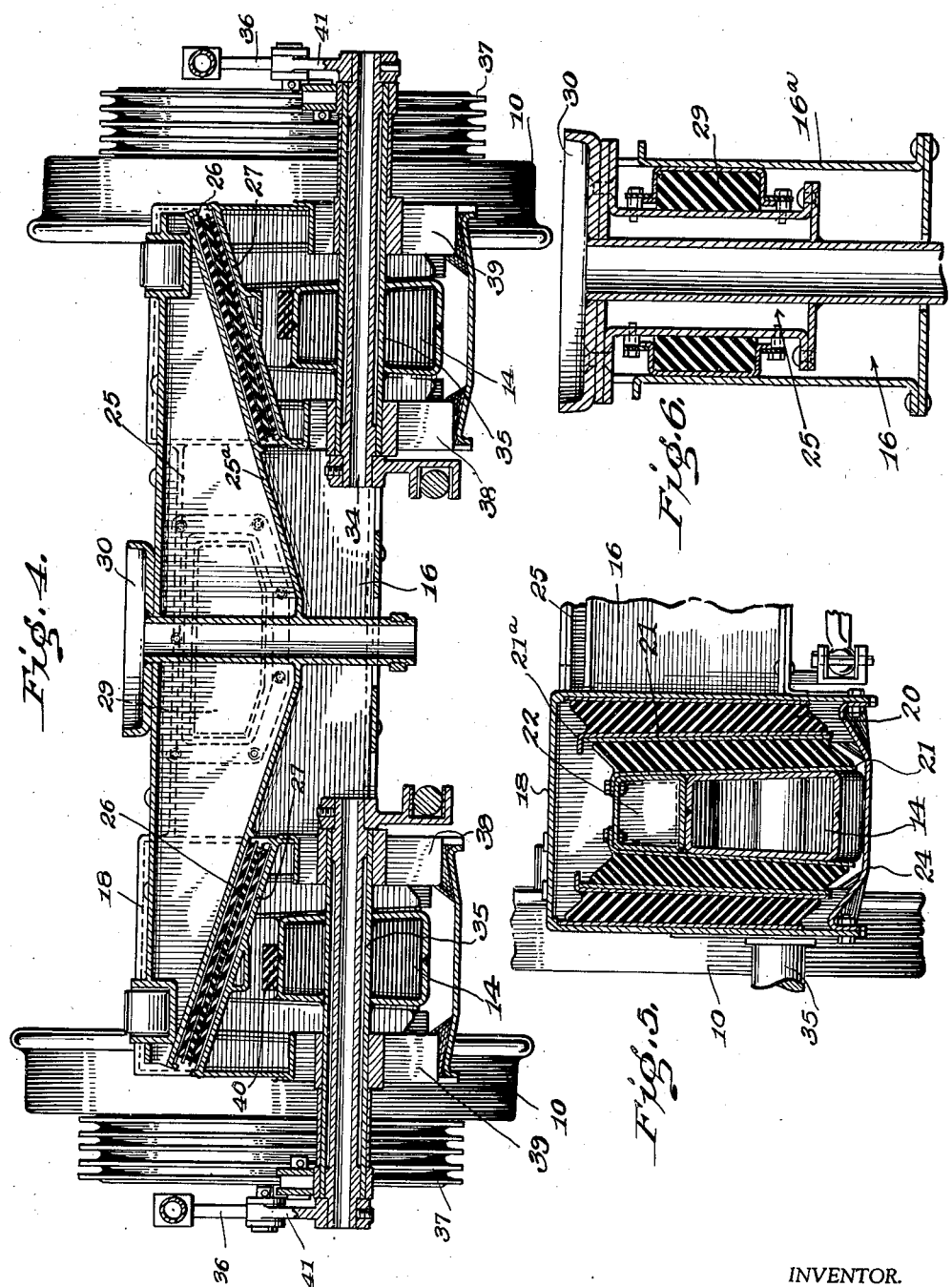
INVENTOR.
Joseph Ledwinka
BY
ATTORNEY.

Patented Oct. 1, 1940

2,216,715

UNITED STATES PATENT OFFICE 2,216,715

FLEXIBLE SUPPORT

Joseph Ledwinka, Philadelphia, Pa., assignor to Edward G. Budd Manufacturing Company, Philadelphia, Pa., a corporation of Pennsylvania Application April 9, 1937, Serial No. 135,870

11 Claims. (Cl. 267—63)

This invention relates to improvements in rail car truck construction and more particularly to an improved spring suspension therefor.

The principal object of the invention is to provide an improved spring suspension of rubber placed under varying proportions of shear and compression so that a more flexible suspension is provided under normal loads and a stiff suspension is provided for overloads.

A more particular feature of the invention is to provide rubber panels for the suspension of a transom mechanism on a rail car truck in which a wedging action on the panels sets up shear and compression components and provides a relatively quick damping and sound deadening suspension.

A further object of the invention is to provide a bolster supporting mechanism consisting of a plurality of rubber panels which are placed in shear and compression to resist the vertical and lateral loads on the bolster.

Another object of the invention is to provide a simplified truck construction having a minimum number of parts including a tubular hollow side frame construction and a separate independently carried transom construction saddled over the side frames and in turn adapted to carry a bolster having limited transverse movement.

Further objects and advantages of my invention will appear from the following disclosure of a preferred form of embodiment thereof taken in connection with the attached drawings, in which:

Fig. 2 is a longitudinal vertical section with parts broken away taken substantially along the line 2—2 of Fig. 1.

Fig. 3 is a transverse vertical section with parts broken away and taken substantially along the line 3—3 of Fig. 1.

Fig. 4 is a substantially central transverse vertical section taken along the line 4—4 of Fig. 1.

Fig. 5 is a partial transverse vertical section similar to the structure shown in Fig. 3 with the transom shown in the no-load position.

Fig. 6 is a longitudinal vertical section taken substantially along the line 6—6 of Fig. 1.

Figure 1:
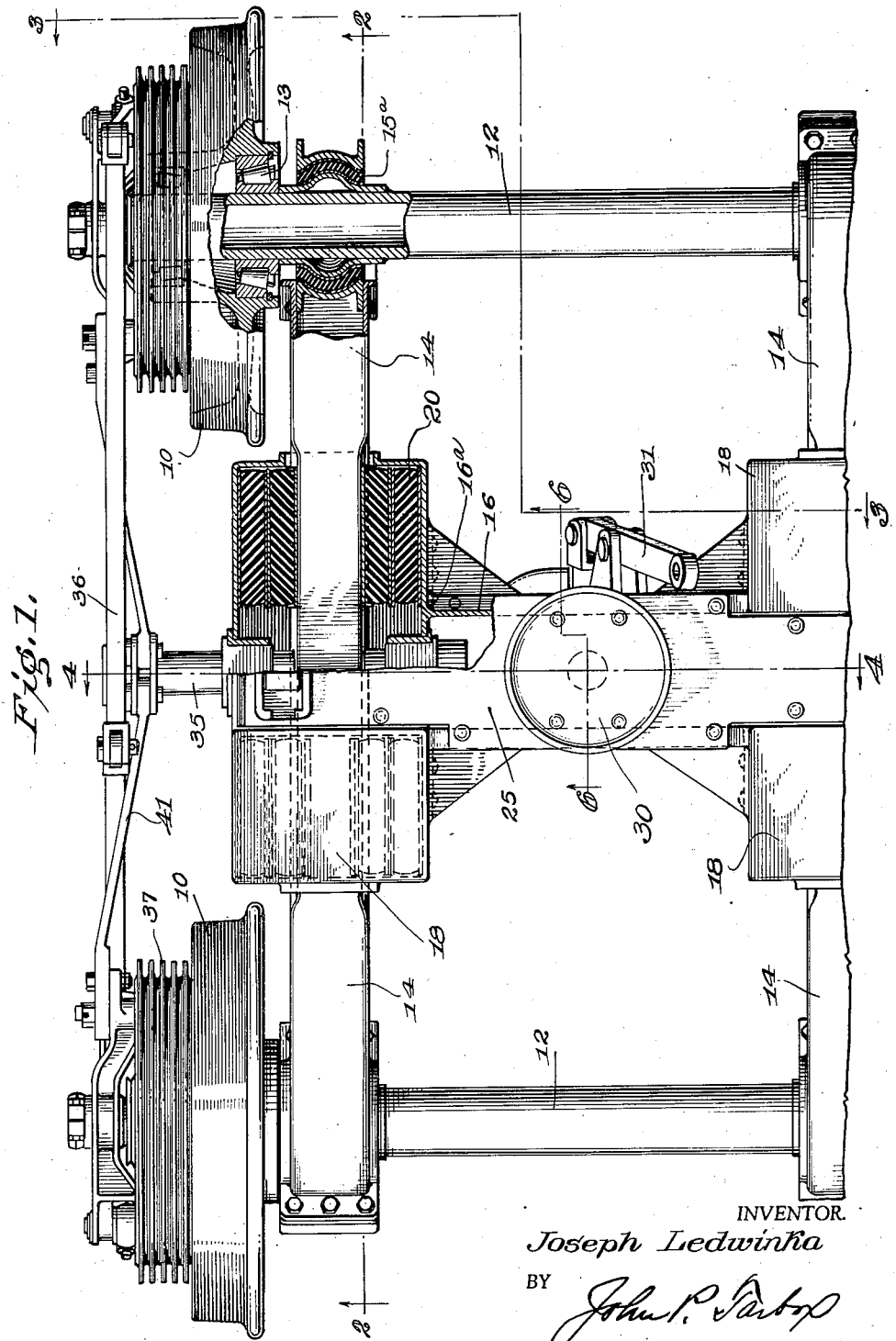
Fig. 1 is a partial plan view with parts broken away showing one form of truck in accordance with my invention.

A truck in accordance with one form of embodiment of the invention includes a series of supporting wheels 10 journaled on fixed axles 12 by bearings 13, such axles supporting the side frame members 14. As shown in Fig. 2, these side frame members 14 are preferably hollow, and continuous and downwardly bowed in the center and may be attached to the axles 12 as by caps 15 and for the desired flexibility, rubber collars 15a may be provided, such collars allowing some rotational movement, and tending to center the frame. It is to be understood that the particular arrangement of the bearings and side frame members, except as hereinafter described, may be of varying arrangement.

The side frames are joined by a transverse transom generally indicated at 16 in Fig. 4 which transom is of substantially H-shape with the parallel portions consisting of four suspension housings 18 forming a saddle over the respective side frame members 14. These suspension housings are joined transversely of the truck by substantially parallel plates 16a which extend to and are integral with the four housings as shown in Fig. 1, such parallel plates being spaced for the support of the brake rigging and a bolster therebetween.

These housings 18 each embrace panels of rubber which as shown in Fig. 5 consist of a pair of substantially planar faced rubber blocks 20 which are vulcanized to plates 21 with the intermediate plates joined together. The external plates are carried by the inner walls of the housings 18 and the internal plates abut the outer walls of the side frame member 14. Preferably a spacing block 22 is provided at the top of the side frames 14 to keep the rubber panels apart and to offer a full surface for contact with the rubber panels. Each of the panels is similar and has a projecting flange 21a on the top edge of one plate which overlaps the adjacent plate and with the internal flanges 21a resting on and secured to the spacing block 22. The panels are slightly wider at the top than at the bottom and the frame members 14 are outwardly and downwardly flared in this region to give a wedging action.

The loaded appearance of the spring suspension is shown in Fig. 3 and it will be noted that the movement of the transom downward with respect to the frame 14 causes a load on the respective panels in shear as well as in compression. Such action gives a relatively great deflection per unit of load increase during the normal working range, although in the subsequent overload and shock condition, the load increase causes a relatively smaller deflection. As the damping action of the rubber is far greater than that of the usual steel springs, easier riding conditions under normal loading are obtained and yet the necessary stiffness under higher loads is available without the need of compound or complicated spring nests. Furthermore, by changing the angle of the side frames slightly, I can obtain either greater or less relative proportion of shear to compression and thus an easier or stiffer suspension in the normal load range without materially changing the bottoming point under maximum load.

It is preferable to assemble the spring panels under some predetermined compression load which is done by assembling the parts and then tying the sides of the housings 18 together by the plate 24. The frame 14 rests on this plate only prior to the support of a car body, at which time the body load deflects the rubber panels somewhat. This plate 24 may also be used to increase the wedging action on the side frame 14 by using a plate of less than normal width and thus drawing in the sides of the housings.

For added ease in riding and to resist excessive lateral movements of the car body, a swinging type of bolster 25 may be provided with its lower surface 25a inclined from the center outwardly and upwardly, and being supported on rubber panels 26 which are carried by supporting trays 27 carried between the side walls 16a of the transom structure. As in the prior construction, these rubber panels may also be a series of planar blocks vulcanized to metal spacing plates for a maximum development of shear in a plane parallel to the bottom supporting trays 25a of the bolster. Vertical loads are resisted primarily under compression, and the lateral movements are resisted primarily by shear reactions in the panels. Such reactions tend to raise the end of the bolster in the direction of the lateral forces, and thus to counteract the rolling tendency of the car body. Rubber blocks 29 between the walls of the bolster and the walls of the transom mechanism may be conveniently used as shown in Fig. 6 and these are suitably mounted adjacent the center plate 30.

Although the brake mechanism is not a part of the invention claimed herein, it is to be noted that the actuation is through a lever 31 carried by the transom mechanism which operates an equalizer 32 shown in Fig. 3 which in turn operates the actuating rods 34 shown in Fig. 4 through suitable lever arms. The rods 34 extend through shafts 35, carried by and welded to the tubular side frames 14, outward beyond the transom to a point external of the truck from which levers 36 operate links extending to brake cams operated in a manner similar to automobile type drum brakes, the drums 37 of which are mounted on the outside of the wheels 10. The torque is resisted by arms 41 supported from the outer extensions of shaft 35. Suitable openings 38 and 39 are provided for free movement of the transom with respect to the shafts 35 to allow for the relative movement between the transom and the side frames. If desired, limiting blocks 40 of a resilient material may be provided between the bottom of the transom mechanism and the top of the side frames 14 as shown in Fig. 4.

Although I have shown a preferred form of embodiment of my invention, I am aware that modifications may be made thereto and I therefore desire a broad interpretation of my invention within the scope and spirit of the disclosure herein and the claims appended hereinafter.

What I claim is:

1. In a rail car truck having a transom member, a floating bolster supported therefrom, and a non-metallic panel between said transom and said bolster and secured to said members, lateral movements of said bolster setting up shear in said panel.

2. In a rail car truck having a transom member, a floating bolster supported therefrom, and a non-metallic panel between said transom and said bolster and secured to said members, lateral movements of said bolster setting up shear in said panel, said panel being normally under compression.

3. A truck having a frame and a bolster supported thereby, said bolster and the supporting frame having complementary surfaces which are upwardly and outwardly inclined, and rubber panels between said surfaces and attached thereto, said rubber panels being normally under compression and being subject to substantial shear forces on the lateral movement of the bolster.

4. A truck having a frame and a bolster supported thereby, said bolster and the supporting frame having complementary surfaces which are upwardly and outwardly inclined, and rubber panels between said surfaces and attached thereto, said rubber panels being normally under compression and being subject to substantial shear forces on the lateral movement of the bolster, said lateral movement tending to raise the outer end of the bolster.

5. A rail car truck of the class described comprising a frame having upwardly and outwardly inclined supporting surfaces, a bolster having complementary supporting surfaces, and rubber panels attached to said frame and to said inclined surfaces, said bolster being self-centering with lateral movements of the bolster resisted by forces tending to raise said bolster on the outer end and by shear forces in the rubber panels.

6. In a vehicle suspension for railway trucks, side frame members, a transverse transom member flexibly interconnecting said side frame members, said transom member and side frame members having opposed longitudinally extending faces of substantial area, flat rubber panels interposed between the opposed faces of said members and secured thereto to permit relative vertical, longitudinal and twisting movements between said members, the relative vertical, longitudinal and twisting movements being taken by the rubber panels largely in shear, and transverse movement of the transom being resisted by the rubber in compression.

7. A vehicle suspension for railway trucks of the type having side frames and a transverse member supported from said side frames by rubber mountings positioned intermediate the ends of said side frame members, said rubber mountings comprising longitudinally extending flat rubber panels disposed at an angle to the direction of normal load, whereby transverse movements of said transverse member will be transmitted to the panels mainly as a compression load while vertical and longitudinal movements of said transverse member will be transmitted to said panels mainly as shear load, substantially all the rubber of said panels being utilized to absorb the shear and compression loads.

8. A vehicle suspension according to claim 7 in which the transverse member has lateral portions adapted to straddle the side frames and held in spaced lateral position with respect thereto by the flat rubber panels.

9. A vehicle suspension according to claim 7 in which the transverse member has lateral portions adapted to straddle the side frames and held in spaced lateral position with respect thereto by the flat rubber panels, the panels being wedge-shaped in transverse cross section with the narrowest parts of the wedge-shape at the bottoms thereof.

10. A vehicle suspension according to claim 7 in which the transverse member has lateral portions adapted to straddle the side frames and held in spaced lateral position with respect thereto by the flat rubber panels, the lateral portions being tied together at one end by a removable bridging means to facilitate the assembly and disassembly of the transverse and side frame members.

11. A vehicle suspension according to claim 7, in which the transverse member has lateral portions adapted to straddle the side frames and held in spaced lateral position with respect thereto by the flat rubber panels, and means for tying together the lateral portions at their free ends arranged so as to draw them toward each other and place the rubber panels under initial compression.

JOSEPH LEDWINKA.